United States Patent [19]

Read

[11] Patent Number: 4,598,175
[45] Date of Patent: Jul. 1, 1986

[54] TELEPHONE SET WITH TWO POSITION MOUNTING WITH ALTERNATE SEATING OF HANDSET

[75] Inventor: Clifford D. Read, Almonte, Canada

[73] Assignee: Northern Telecom Limited, Montreal, Canada

[21] Appl. No.: 555,624

[22] Filed: Nov. 28, 1983

[51] Int. Cl.⁴ .............................................. H04M 1/02
[52] U.S. Cl. .............................. 179/100 C; 179/100 R; D14/56
[58] Field of Search ................... 179/100 C, 103, 146, 179/178, 179; D14/60, 61, 62, 63, 53, 56

[56] References Cited

U.S. PATENT DOCUMENTS

| | | | |
|---|---|---|---|
| D. 275,099 | 8/1984 | Spilmont et al. .................. | D14/53 |
| 2,492,375 | 12/1949 | Boswau et al. ................. | 179/100 C |
| 2,558,699 | 6/1951 | Bjerknes .......................... | 179/100 C |
| 3,073,911 | 1/1963 | Mattke et al. ................... | 179/100 C |
| 3,521,008 | 7/1970 | Tyson .............................. | 179/100 C |

*Primary Examiner*—Gene Z. Rubinson
*Assistant Examiner*—R. Vaas
*Attorney, Agent, or Firm*—Sidney T. Jelly

[57] ABSTRACT

A telephone set for optional two position mounting, on a wall or desk, has a flat rectangular main body portion of the base with a projecting portion extending forwardly and upwardly from the top edge of the body portion. The projecting portion includes two surfaces at right angles defining a corner through which extends the hook switch actuating member. The handset has a recess in its undersurface which rests on the projecting portion. The handset rests on one or the other of the two surfaces at right angles, depending upon the mounting position of the base.

6 Claims, 6 Drawing Figures

TELEPHONE SET WITH TWO POSITION MOUNTING WITH ALTERNATE SEATING OF HANDSET

This invention relates to a telephone set which can be mounted in either of two positions, for example on a vertical or a horizontal surface, the handset seating on the telephone set base in one of two alternate positions depending upon the mounting position of the base.

Many desk mounting, or other horizontal surface mounting, telephone sets have the handset resting on the base in a cross-wise position, usually at the rear of the base. Wall mounting telephone sets, or other vertical surface mounting, often have the handset resting in a vertical position, hanging down with one end, usually the transmitter end, resting on the hook switch actuator.

To provide a telephone set which can be mounted, as desired, on a vertical surface or a horizontal surface, it is usual to have the handset seating in the same position as is often used in wall mounting, that is extending from top to bottom, or back to front, depending on mounting position.

The present invention provides a telephone set which can be positioned on a vertical surface or a horizontal surface. The telephone set base is configured at the end which is the top in a vertical position and the rear in a horizontal position to provide two alternate seating positions for the handset. In accordance with the invention, the telephone set base has an upwardly and outwardly projecting member with two surfaces substantially at right angles, defining a corner, and a hook switch actuator positioned at the corner. The two surfaces face upwards and outwards in a vertical mounting and forwards and upwards in a horizontal mounting. Also in accordance with the invention, the handset has a recess in the underside of the central portion, the recess seating on that surface of the projecting member which is facing upwards, and moving the hook switch actuator.

The invention will be readily understood by the following description of two embodiments, by way of example, in conjunction with the accompanying drawings, in which.

Figure 1:
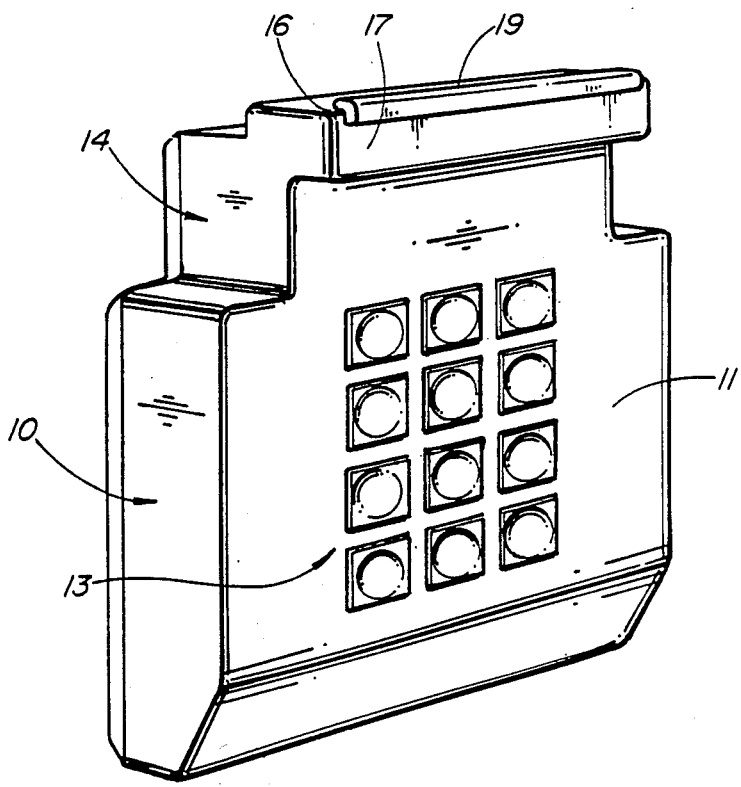
FIG. 1 is a perspective view of one form of telephone set base, in a vertical mounting position.
Figure 2:
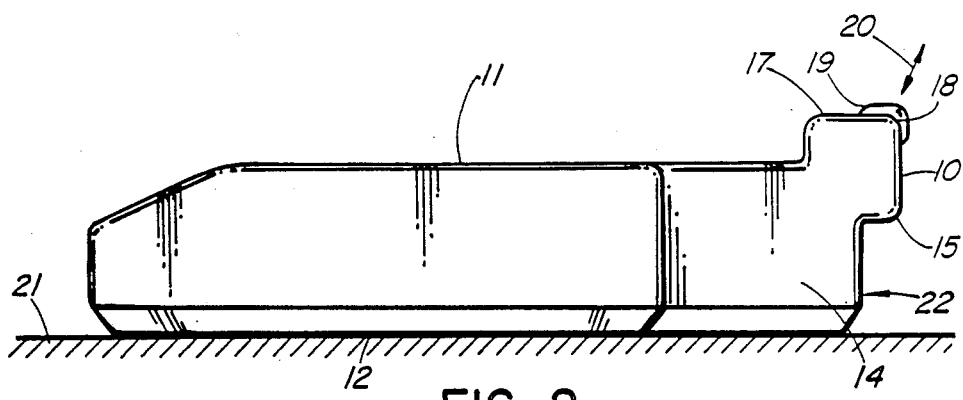
FIG. 2 is a side view of the base illustrated in FIG. 1.

In the example illustrated in FIGS. 1 and 2, a telephone set base indicated generally at 10 is of rectangular form and relatively thin having front and back surfaces 11 and 12 respectively. On the front surface 11 is a dial or key pad, indicated generally at 13. The base extends upwards, as seen in FIGS. 1 and 2, having a portion 14 of reduced width. A forwardly and upwardly projecting member or portion 15 extends from the top edge 22 of portion 14. The projecting member has two surfaces 16 and 17 which are at right angles, defining a corner 18. Projecting through the corner 18 is a hook switch actuating member 19. The hook switch actuating member, in the example moves at an angle to both surfaces 16 and 17, for example at approximately 45° to the horizontal, as indicated by arrow 20. In FIG. 2 the base is seen mounted against a wall or similar vertical surface 21.

Figure 3:
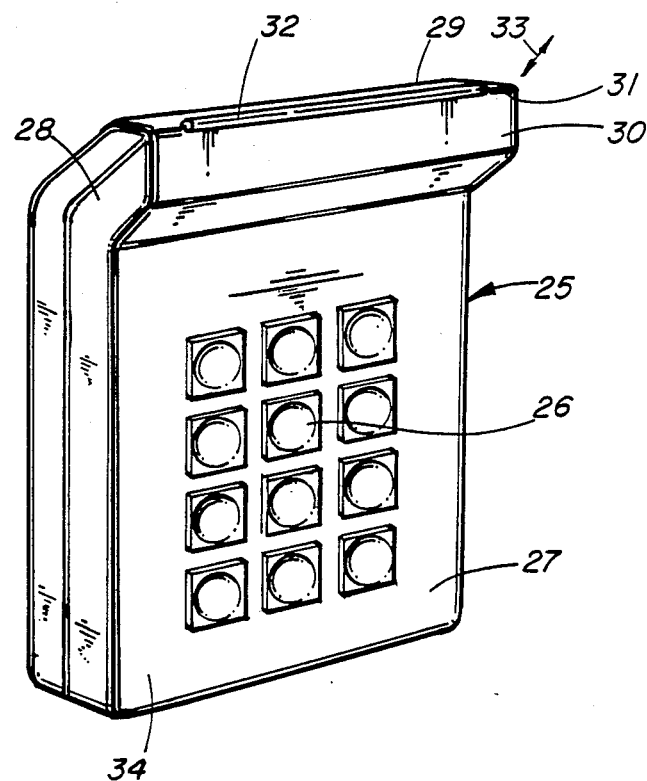
FIG. 3 is a perspective view of another form of telephone set base, also in a vertical mounting position.

FIG. 3 illustrates an alternative base 25, again of generally rectangular form and relatively thin. A dial or key pad 26 is provided at the front surface 27. A forwardly and upwardly projecting member or portion 28 extends at the top edge of the base, having two surfaces 29 and 30 at right angles and defining a corner 31. Projecting through the corner 31 is a hook switch actuating member 32. As in the arrangement illustrated in FIGS. 1 and 2, the actuating member 32 moves at an angle to the surfaces 29 and 30, for example at approximately 45° as indicated by arrow 33. The base 25, in FIG. 3, is illustrated as mounted against a wall or similar vertical surface 34.

Figure 4:
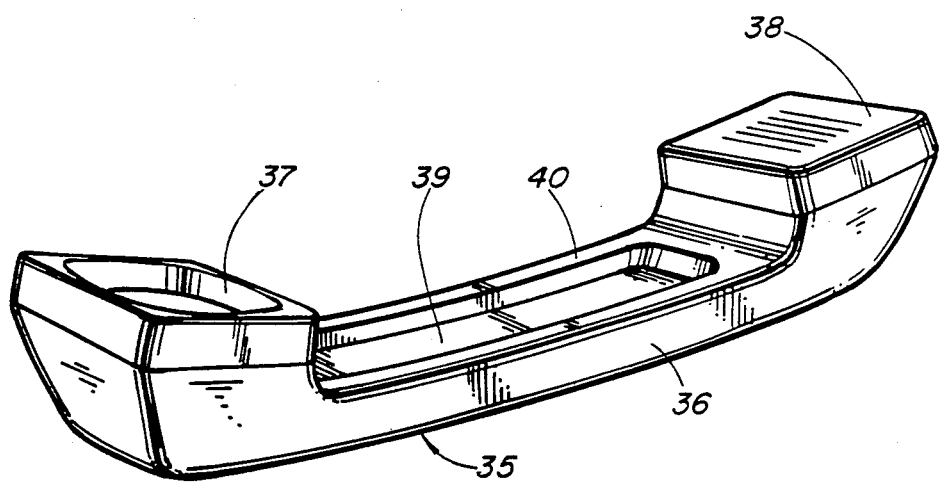
FIG. 4 is a perspective view of a form of handset for use with the bases of FIGS. 1 and 2 and FIG. 3.

FIG. 4 illustrates a handset 35 which can be used with the telephone set bases illustrated in FIGS. 1 and 2 in FIG. 3. As seen, the handset has a central portion 36, held by the hand of the user when the telephone is in use. At each end are projections 37 and 38 in which are positioned the transmitter and receiver respectively. The handset has a recess 39 and in the undersurface of the central portion 36. In FIG. 4 the undersurface, indicator at 40, is facing upwards, but in position on the base faces downward.

The recess 30 is shaped to seat on the forwardly and upwardly projection member of the base, member 15 in FIGS. 1 and 2 and member 38 in FIG. 3. When the telephone set base is mounted on a vertical surface, the recess 39 seats on the upward facing one of the two surfaces of the projecting member, that is on surface 16 in the example of FIGS. 1 and 2 and on surface 29 in the example of FIG. 3. When the telephone set base is mounted on a horizontal surface, the recess 39 seats on the surfaces 17 or 30 as these will now be upward facing.

Figure 5:
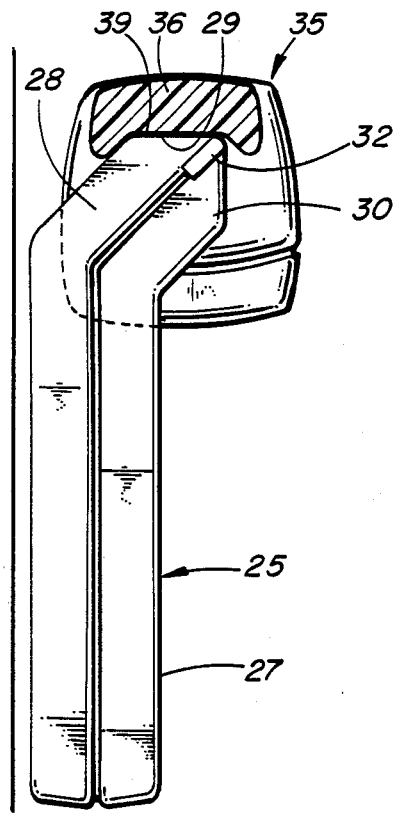
FIG. 5 is a side view of the base of FIG. 4 illustrating the handset seated, in a vertical mounting.
Figure 6:
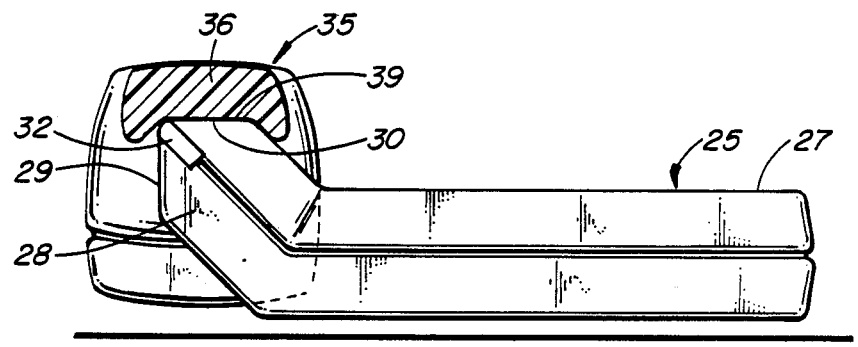
FIG. 6 is a side view of the base of FIG. 4 illustrating the handset seated, in a horizontal mounting.

This is seen in FIGS. 5 and 6 where the example of a telephone set base as illstrated in FIG. 3, is shown in both vertical and horizontal mounting, with the handset on the base. In FIG. 5, the vertical mounting mode, the handset is seen seated on the surface 29, while in FIG. 6, the horizontal mounting mode, the handset is seen seated on surface 30. In both examples, the hook switch actuating member 32 has been pushed in, to actuate the hook switch to an on-hook condition. The actuating member 32 is illustrated diagrammatically, it being inside the projecting member 28.

A similar arrangement will occur with the telephone set base illustrated in FIGS. 1 and 2. The surfaces 29 and 30 in FIGS. 5 and 6 correspond to the surfaces 16 and 27, in FIGS. 1 and 2 and corresponding seating of the recess in the handset will occur.

Other forms and shapes, of telephone set bases and handsets, can be used to give the same facility. It will be appreciated that, with the actuating member 32 and 19, acting at 45° to the surfaces 29 and 30 and surfaces 16 and 17, the pressure on the actuating member is the same, whether the base is mounted on a vertical or horizontal surface.

What is claimed is:

1. A telephone set having a base and a handset on the base;
    said base comprising:
        a flat rectangular main body portion having planar rectangular front and back surfaces extending parallel to each other, parallel side edges, and top and bottom edges extending normal to said side edges;

a central projecting portion extending forward of said front surface and upward from said top edge, said projecting portion having a front surface extending forward of and parallel to the plane of the front surface of the main body portion, and also having a top surface spaced from and extending parallel to the top edge of the main body portion, said top and front surfaces of the projecting portion joined to define a corner positioned forward of the front surface of the main body portion and above said top edge of said main body portion;

and a hook switch actuating member extending through said corner;

said handset comprising a center portion extending between transmitter and receiver housings, said center portion including an elongate recess in an undersurface thereof, said recess including a bottom surface; said recess dimensioned to sit over the projecting portion, the bottom surface of said recess resting on said front surface of said projecting portion when said base is on a horizontal surface, and said bottom surface of said recess resting on said top surface of said projecting portion when said base is positioned on a vertical surface, said corner being in said recess and the bottom surface of the recess in contact with and depressing said hook switch actuating member when said handset rests on said base.

2. A telephone set as claimed in claim 1, said base including a second body portion extending from said main body portion, and of a reduced width relative to said main body portion, said projecting portion extending from a top edge of said second body portion.

3. A telephone set as claimed in claim 1, said projecting portion having a rectangular cross-section viewed from a side of said base.

4. A telephone set as claimed in claim 1, said projecting portion including third and fourth parallel back and front surfaces, one of said third and fourth parallel surfaces extending from the back surface of said main body portion and the other of said third and fourth parallel surfaces extending from the front surface of said main body portion, said third and fourth parallel surfaces connected to said front and top surfaces of said projecting portion.

5. A telephone set as claimed in claim 1, said hook switch actuating member supported for movement at approximately 45° to the front surface of said main body portion.

6. A telephone set as claimed in claim 1, including a push-button dial on said front surface of said base.

* * * * *